(12) United States Patent
Kim

(10) Patent No.: US 10,052,523 B2
(45) Date of Patent: Aug. 21, 2018

(54) SWIMMING ASSISTANCE APPARATUS

(71) Applicant: Jeong Hun Kim, Seoul (KR)

(72) Inventor: Jeong Hun Kim, Seoul (KR)

(*) Notice: Subject to any disclaimer, the term of this patent is extended or adjusted under 35 U.S.C. 154(b) by 0 days.

(21) Appl. No.: 15/496,729

(22) Filed: Apr. 25, 2017

(65) Prior Publication Data

US 2018/0161628 A1 Jun. 14, 2018

(30) Foreign Application Priority Data

Dec. 8, 2016 (KR) .................. 10-2016-0167009

(51) Int. Cl.
| | |
|---|---|
| *A63B 31/08* | (2006.01) |
| *A63B 31/10* | (2006.01) |
| *A63B 31/12* | (2006.01) |
| *H04N 5/225* | (2006.01) |
| *H04N 7/18* | (2006.01) |
| *G03B 17/08* | (2006.01) |

(52) U.S. Cl.
CPC .............. *A63B 31/08* (2013.01); *A63B 31/10* (2013.01); *A63B 31/12* (2013.01); *G03B 17/08* (2013.01); *H04N 5/2252* (2013.01); *H04N 7/185* (2013.01); *A63B 2208/03* (2013.01); *A63B 2220/18* (2013.01); *A63B 2220/34* (2013.01); *A63B 2220/44* (2013.01); *A63B 2220/807* (2013.01); *A63B 2220/833* (2013.01); *A63B 2225/50* (2013.01); *A63B 2230/06* (2013.01); *A63B 2244/20* (2013.01)

(58) Field of Classification Search
CPC ......... A63B 31/00; A63B 31/12; A63B 35/02; A63B 69/12

USPC .................................................. 441/55, 60
See application file for complete search history.

(56) References Cited

U.S. PATENT DOCUMENTS

| 7,169,000 | B1* | 1/2007 | Hernandez ............ A63B 31/12 441/60 |
| 9,259,632 | B2* | 2/2016 | DiLorenzo ............ A63B 69/12 |
| 9,522,303 | B2* | 12/2016 | Kim ..................... A63B 31/12 |
| 2010/0030482 | A1 | 2/2010 | Li |
| 2011/0294382 | A1* | 12/2011 | Puls ..................... B63C 9/0005 441/89 |
| 2014/0228649 | A1 | 8/2014 | Rayner et al. |
| 2015/0232160 | A1* | 8/2015 | Robinson ............... B63C 11/49 441/135 |

(Continued)

FOREIGN PATENT DOCUMENTS

KR 10-1559659 B1 10/2015

*Primary Examiner* — Lars A Olson
(74) *Attorney, Agent, or Firm* — Novick, Kim & Lee, PLLC; Sang Ho Lee

(57) ABSTRACT

Provided is a swimming assistance apparatus with an ICT function. The swimming assistance apparatus includes: a body part made of a material which floats on water or having a hollow tube which floats on water; a fitting hole formed in the body part and defined to penetrate through the body part to surround a part of a user's body; a cut part defined on at least one side of a wall of the fitting hole; and a sensor unit for measuring at least one of the user's posture information, work rate information and bio-information, so that the user's body floats on water by buoyancy of the body part when the user swims in a state where a part of the user's body is inserted into the fitting hole.

13 Claims, 19 Drawing Sheets

(56) References Cited

U.S. PATENT DOCUMENTS

2015/0283447 A1 10/2015 DiLorenzo et al.
2015/0305655 A1 10/2015 Sharpe et al.

* cited by examiner

SWIMMING ASSISTANCE APPARATUS

CROSS-REFERENCE TO RELATED APPLICATION

This application claims priority to Korean Patent Application No. 10-2016-0167009, filed in the Korean Intellectual Property Office on Dec. 8, 2016, the disclosure of which is incorporated herein by reference in its entirety.

FIELD OF THE DISCLOSURE

The present disclosure relates to a swimming assistance apparatus with an ICT function, and more particularly, to a swimming assistance apparatus which can measure swimming work rate information and swimming posture information and provide an underwater captured image.

BACKGROUND OF THE DISCLOSURE

With development of wearable devices, such as smart watches or smart bands, exercise recording applications using a user's exercise information and bio-information have been widely used. Recently, application programs available in various fields, such as walking, running, cycling, climbing and so on, have been released. Such application programs may analyze a user's exercise performance, provide information related with health, and provide an information-sharing function for other users.

Moreover, recently, utilization of action cameras, which are small-sized camcorders usable during sports activities, is increasing. Because a user can take images in first-person after attaching the action camera onto his or her body or a helmet, a bicycle or others, such action camera has become very popular among people who enjoy sports activities.

However, application programs which can record and analyze a user's exercise information are not vitalized in the swimming field, and it is not easy to take images of underwater conditions using the action camera because swimming is an underwater sport performed without any particular equipment.

SUMMARY OF THE DISCLOSURE

Accordingly, the present disclosure has been made in view of the above-mentioned problems occurring in the prior art, and it is an object of the present disclosure to provide a swimming assistance apparatus which can measure information of a swimming work rate and information of a swimming posture and provide an underwater captured image.

To accomplish the above object, according to one aspect of the present disclosure, there is provided a swimming assistance apparatus including: a body part made of a material which floats on water or having a hollow tube which floats on water; a fitting hole formed in the body part and defined to penetrate through the body part to surround a part of a user's body; a cut part defined on at least one side of a wall of the fitting hole; and a sensor unit for measuring at least one of the user's posture information, work rate information and bio-information, wherein the user's body floats on water by buoyancy of the body part when the user swims in a state where a part of the user's body is inserted into the fitting hole.

Preferably, the sensor unit may include at least one of: a posture sensor for measuring at least one of slope information and angular velocity information of the swimming assistance apparatus; a work rate sensor for measuring at least one of speed information and travel distance information of the swimming assistance apparatus; and a heart rate sensor for measuring the user's heart beat information.

Moreover, the swimming assistance apparatus may further include a communication unit for transmitting at least one of the user's posture information, work rate information and bio-information measured by the sensor unit to the outside.

Furthermore, the swimming assistance apparatus may further include a sensor unit insertion recess formed at an area of the body part and formed to be inwardly dented, and to which the sensor unit is inserted.

According to another aspect of the present disclosure, to accomplish the above object, there is provided a swimming assistance apparatus including: a body part made of a material which floats on water or having a hollow tube which floats on water; a fitting hole which is formed in the body part to penetrate through the body part and to surround a part of a user's body; a cut part defined on at least one side of a wall of the fitting hole; and an image capturing unit combined to an area of the body part to capture an image, wherein the user's body floats on water by buoyancy of the body part when the user swims in a state where a part of the user's body is inserted into the fitting hole, and the image capturing unit captures an underwater image.

Preferably, the image capturing unit may include: a camera unit which captures an image of the front to generate image data; a combining part combined to the camera unit; and a strap part combined to the combining part and combined to the body part to surround an area of the body part.

Moreover, the image capturing unit may include: a camera unit which captures an image of the front to generate image data; a combining part combined to the camera unit; and a clip part combined to the combining part and combined to the body part to grip an area of the body part.

Furthermore, the swimming assistance apparatus may further include a camera insertion recess formed in an area of the body part and formed to be inwardly dented so that the image capturing unit is inserted into the camera insertion recess, and the image capturing unit includes a camera unit for capturing an image of the front to generate image data and is inserted and combined into the camera insertion recess.

Additionally, the swimming assistance apparatus may further include a camera insertion recess formed in an area of the body part and formed to be inwardly dented so that the image capturing unit is inserted into the camera insertion recess. The image capturing unit may include: a camera unit which captures an image of the front to generate image data; a combining part combined to the camera unit; and a guide part which is inserted and combined into the camera insertion recess and to which both sides of the combining part are combined so that the combining part slides vertically.

In addition, the swimming assistance apparatus may further include a camera insertion recess formed in an area of the body part and formed to be inwardly dented so that the image capturing unit is inserted into the camera insertion recess, and the image capturing unit may include: a camera unit which captures an image of the front to generate image data; and a combining part which is inserted and combined into the camera insertion recess and has an area combined to the camera unit. The camera unit may rotate on a hinge part formed at the combining part to be inserted into the camera insertion recess or to protrude outwardly from the camera insertion recess.

Moreover, the swimming assistance apparatus may further include: a location measuring unit for measuring the location of the swimming assistance apparatus to output location information; and a communication unit for transmitting the image data generated by the camera unit and the location information generated by the location measuring unit to the outside.

Furthermore, the swimming assistance apparatus may further include: a sensor unit for measuring at least one of the user's posture information, work rate information and bio-information; and a communication unit for transmitting at least one of the user's posture information, work rate information and bio-information measured by the sensor unit to the outside.

Additionally, the image capturing unit may be a mobile terminal.

According to another aspect of the present disclosure, to accomplish the above object, there is provided a swimming assistance apparatus including: a body part made of a material which floats on water or having a hollow tube which floats on water; a fitting hole formed in the body part and defined to penetrate through the body part to surround a part of a user's body; a cut part defined on at least one side of a wall of the fitting hole; and a terminal insertion recess which is formed in an area of the body part and is inwardly dented to a predetermined depth, and to which an area of the mobile terminal is inserted, wherein the user's body floats on water by buoyancy of the body part when the user swims in a state where a part of the user's body is inserted into the fitting hole.

Preferably, the terminal insertion recess may be formed at an area of the body part and be dented vertically relative to the upper surface of the body part so that the mobile terminal is inserted vertically.

Moreover, the terminal insertion recess may be formed at an area of the body part and be inwardly dented such that the mobile terminal is inserted in a horizontal direction.

Furthermore, the width and the length of the terminal insertion recess may be shorter than the width and the length of the upper surface of the body part respectively.

Additionally, the swimming assistance apparatus may further include a terminal combining part implemented by at least one of Velcro tapes, snap fasteners, magnets, rings, hooks and zippers in order to prevent separation of the mobile terminal inserted into the terminal insertion recess.

In addition, the mobile terminal may include: a camera for capturing an image of the front to generate image data; a posture sensor for measuring at least one of slope information and angular velocity information of the mobile terminal; a work rate sensor for measuring at least one of speed information and travel distance information of the mobile terminal; a communication unit for transmitting the image data generated by the camera to the outside; and a location measuring unit for measuring the location of the mobile terminal to output location information.

As described above, according to an embodiment of the present disclosure, the swimming assistance apparatus can measure information of a swimming work rate and information of a swimming posture and provide an underwater captured image.

DETAILED DESCRIPTION

Figure 1A:
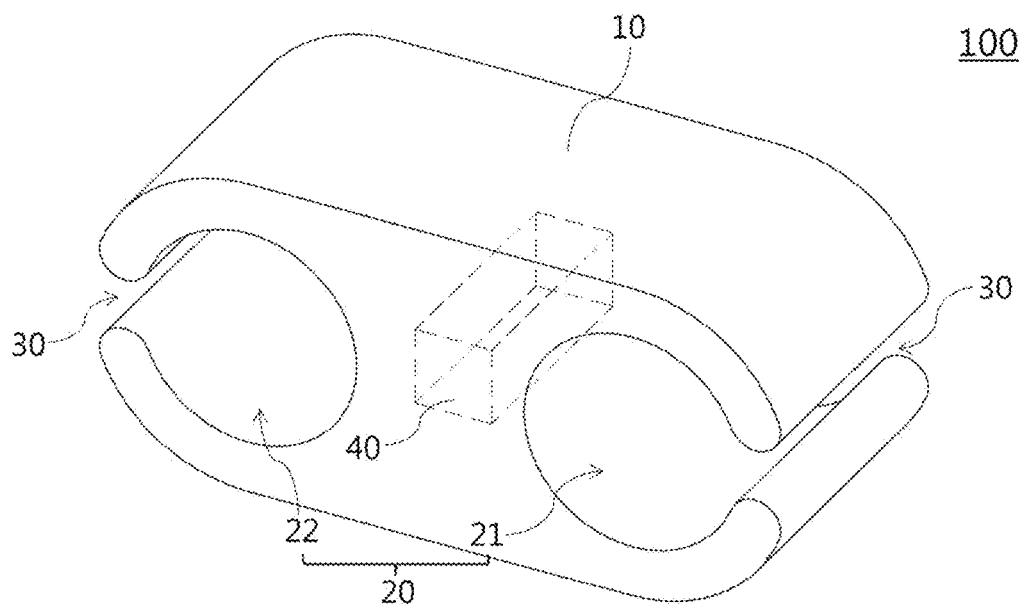
FIGS. 1A and 1B are a view showing a swimming assistance apparatus according to an embodiment of the present disclosure.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure. Hereinafter, exemplary embodiments of the present disclosure will be described in detail. However, the present disclosure is not limited to the embodiments disclosed below, but can be implemented in various forms by those skilled in the art.

In the description of the present disclosure, to "connect" some part with another part means that some part is "directly connected" with another part and that some part is "indirectly connected" with another part through an element. Furthermore, unless explicitly stated to the contrary, the word "comprise," "comprises" or "comprising" used throughout the specification does not mean the exclusion of the other elements but means to imply the inclusion of the other elements.

Figure 1B:
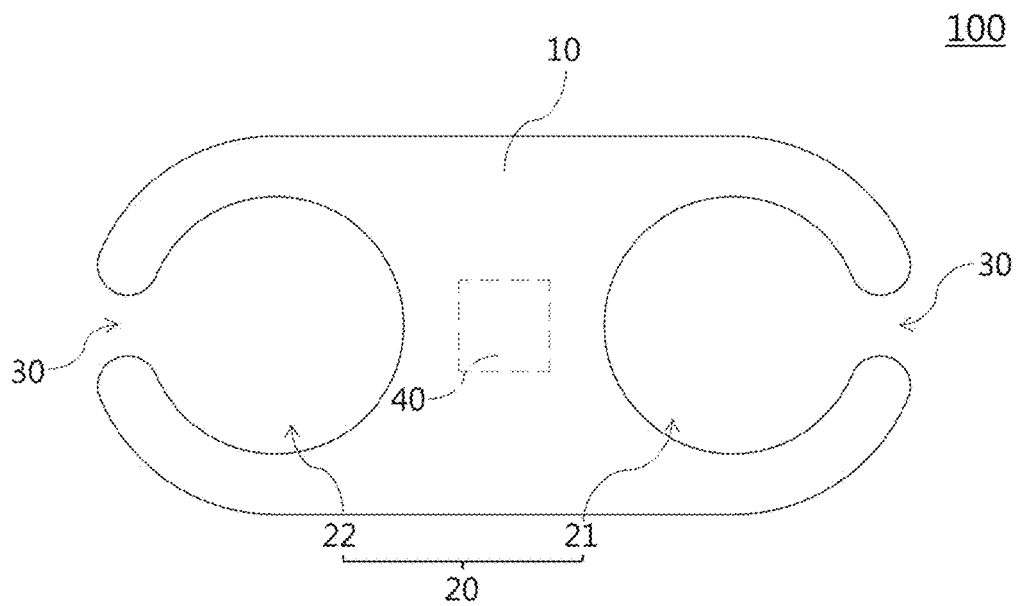

FIGS. 1A and 1B are a view showing a swimming assistance apparatus according to an embodiment of the present disclosure. FIG. 1A is a perspective view showing a swimming assistance apparatus 100 according to the embodiment of the present disclosure, and FIG. 1B is a front view showing the swimming assistance apparatus 100.

Referring to FIGS. 1A and 1B, the swimming assistance apparatus 100 according to the embodiment of the present disclosure may include a body part 10, a fitting hole 20, a cut part 30, and a sensor unit 40.

The body part 10 may be made of a material floating on water or may be formed in a hollow tube type floating on water. As an example, the body part 10 may be made of a material, such as extruded foam polystyrene or ethylene vinyl acetate. The body part 10 may be basically formed in a shape of an elliptic cylinder, and may have one of various shapes.

The body part 10 may supply a user's body with buoyancy. The buoyancy of the body part 10 may be determined by the volume and the density of the body part 10 submerged under water. As the volume of the body part 10 submerged under water is increased and the density of the body part 10 is low, the buoyancy by the body part 10 may be increased.

The fitting hole 20 is formed in the body part 10 to penetrate through the body part 10 so as to surround a part of the user's body. As an example, the fitting hole 20 may be formed in a shape of a hollow cylinder, and may be formed to penetrate the body part 10 in a longitudinal direction. According to an embodiment, two fitting holes 20 may be formed such that the user can insert his or her ankles into the fitting holes 20. In the case that there are two fitting holes 20, the fitting hole that the user's left ankle is inserted and fixed is defined as a first fitting hole 21, and the fitting hole that the user's right ankle is inserted and fixed is defined as a second fitting hole 22.

According to an embodiment, the body part 10 may be made of a flexible or elastic material, and the size of the fitting hole 20 may be regulated by the user. Accordingly, the user's ankle parts or the user's thigh parts may be inserted into the first fitting hole 21 and the second fitting hole 22. If the user's thigh parts are inserted into the first fitting hole 21 and the second fitting hole 22, the user can do a swimming style training in a state where the user's thighs are fixed.

The size of the fitting hole 20 may be formed differently depending on users' body conditions. For instance, the size of the fitting hole 20 may be formed differently depending on classification by age or gender, namely, may be formed for adults and teenagers or for males and females. Moreover, the user may swim after putting his or her hand into the fitting hole 20 to grasp the periphery of the fitting hole 20.

The fitting hole 20 may be formed to collect the user's legs to be at a distance that the user does not feel uncomfortable. That is, the first fitting hole 21 and the second fitting hole 22 may be formed to have a specific distance from each other. When the user swims in the state where his or her legs are inserted into the fitting holes 20, the user's legs can be fixed by the fitting holes 20. Because the user can concentrate on upper body training when swimming in the state where his or her legs are fixed, if the user uses the swimming assistance apparatus 100 according to an embodiment of the present disclosure, his or her upper body strength and waist muscles may be strengthened, and especially, the user may have a good command of the swimming style to move his or her waist from side to side. Additionally, even a disabled person with paraplegia may enjoy swimming when he or she wears the swimming assistance apparatus 100 according to an embodiment of the present disclosure. In addition, the swimming assistance apparatus 100 according to an embodiment of the present disclosure may solve the problem that a beginner cannot concentrate on the swimming posture of the upper body while splashing water with his or her feet.

The cut part 30 may be formed to be cut at a side wall of the fitting hole 20 so that the user can insert his or her body part into the fitting hole 20. As shown in FIG. 1A, the cut parts 30 of the right and left fitting holes may be respectively formed at right and left sides of the fitting holes 20. In general, because power is applied toward the inside of both legs when the user swims, the user's legs are not separated from the fitting holes 20 unless the user intentionally separates his or her legs from the fitting holes 20. Moreover, in an emergency situation, the user can pull out his or her legs from the fitting holes 20 through the cut part 30. Accordingly, the cut part 30 may increase usefulness of the swimming assistance apparatus 100 according to the embodiment of the present disclosure and reduce dangerousness.

FIGS. 1A and 1B illustrate that the cut part 30 is formed at the side of the fitting hole 20, but the location of the cut part 30 may be changed in various ways, for instance, the cut part 30 may be located at an upper side or a lower side of the fitting hole 20. Furthermore, the cut part 30 may be formed at any one of the first fitting hole 21 and the second fitting hole 22, and the location of the cut part 30 formed at the first fitting hole 21 and the location of the cut part 30 formed at the second fitting hole 22 may be different from each other.

In the case that the body part 10 is made of a material of flexible synthetic resin, the width of the cut part 30 increases when the user is inserting his or her leg into the fitting hole 20 through the cut part 30, but the width of the cut part 30 returns to its original state when the user perfectly inserts his or her leg into the fitting hole 20. Therefore, the user can insert his or her leg into the fitting hole 20 more conveniently.

Figure 2:
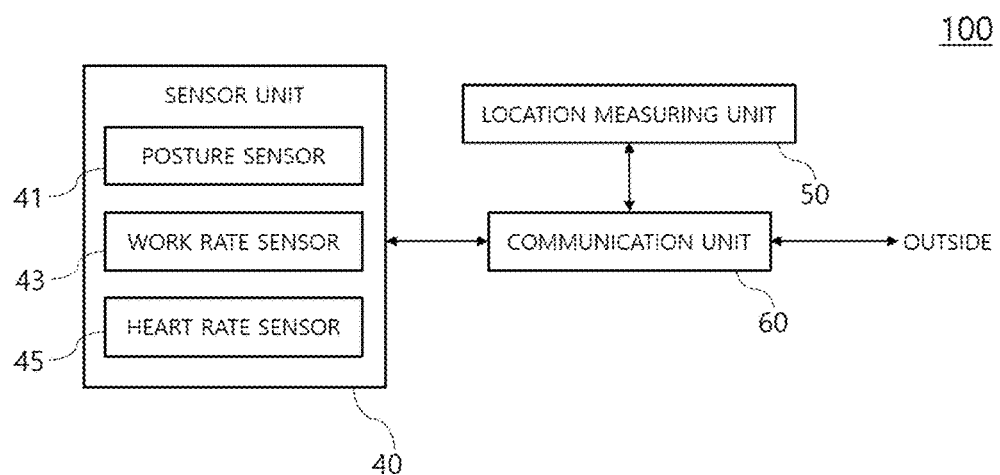
FIG. 2 is a block diagram showing the swimming assistance apparatus according to the embodiment of the present disclosure.

The sensor unit 40 may measure at least one of posture information, work rate information and bio-information of the user, who is wearing the swimming assistance apparatus 100. As shown in FIGS. 1A and 1B, the sensor unit 40 may be embedded in the body part 10, and the location of the sensor unit 40 may be changed in various ways. Referring to FIG. 2, the configuration and operating method of the sensor unit 40 will be described in detail.

In the meantime, the swimming assistance apparatus 100 according to an embodiment of the present disclosure may further include a protrusion part (not shown) protruding toward the center of the fitting hole 20 from some area of the inner face of the fitting hole 20. The protrusion part may be in various forms, such as a straight form, a semispherical form, a spiral form and so on, to strengthen a grip force between the inner face of the fitting hole 20 and the user's body.

FIG. 2 is a block diagram showing the swimming assistance apparatus according to the embodiment of the present disclosure. Referring to FIG. 2, the swimming assistance apparatus 100 may include the sensor unit 40, a location measuring unit 50 and a communication unit 60. Because the body part 10, the fitting hole 20 and the cut part 30 are described above referring to FIGS. 1A and 1B, they are not illustrated in FIG. 2.

The sensor unit 40 may measure at least one of posture information, work rate information and bio-information of the user, who is wearing the swimming assistance apparatus 100 according to the embodiment of the present disclosure. The sensor unit 40 may include at least one of a posture sensor 41, a work rate sensor 43 and a heart rate sensor 45.

The posture sensor 41 may measure at least one of slope information and angular velocity information of the swimming assistance apparatus 100. The posture sensor 41 may be one of a slope sensor, an acceleration sensor and a gyro sensor. The acceleration sensor may measure tri-axial acceleration, and the gyro sensor may measure tri-axial angular velocity in the case of a rotational motion. The swimming assistance apparatus 100 may measure the posture information of the user, who is wearing the swimming assistance apparatus 100 according to an embodiment of the present disclosure, using sensing signals of the slope sensor, the acceleration sensor and the gyro sensor.

As an example, when the user swims wearing the swimming assistance apparatus 100 on the ankles, his or her lower body moves from side to side according to his or her arm movements. The posture sensor 41 senses whether or not the swimming assistance apparatus 100 maintains level, and measures a slope angle that the swimming assistance apparatus 100 moves from side to side to measure the user's swimming posture.

The work rate sensor 43 may measure at least one of speed information and travel distance information of the swimming assistance apparatus 100. The work rate sensor 43 may measure and output swim speed, swim distance, and swim time. The work rate sensor 43 may be an acceleration sensor. The acceleration sensor may measure acceleration, vibration and shock of the swimming assistance apparatus 100, and may calculate swim speed and swim distance by integrating the measured acceleration. The work rate information may contain swim speed, swim distance, swim time, calorie consumption and so on.

The heart rate sensor 45 may measure bio-information, such as heart beat information of the user. As an example, the heart rate sensor 45 may measure heart beat information and oxygen saturation of the user by Photoplethysmography. According to an embodiment, the heart rate sensor 45 may be arranged on the inner face of the fitting hole 20 to measure the user's heart beat information near the user's thighs, calves, ankles or wrists.

The location measuring unit 50 may output location information by measuring the location of the swimming assistance apparatus 100 according to the embodiment of the present disclosure. The location measuring unit 50 may be one of various location measuring units, such as GPS modules capable of measuring the current location by receiving a signal transmitted from a global positioning system (GPS) satellite or WiFi positioning systems.

The communication unit 60 may transmit at least one of the user's posture information, work rate information and bio-information measured by the sensor unit 40 to the outside. Additionally, the communication unit 60 may transmit the location information of the swimming assistance apparatus 100 measured by the location measuring unit 50 to the outside. The communication unit 60 may be a communication module, which supports at least one of various wireless communication technologies, such as Bluetooth, wireless fidelity (WiFi), wideband code division multiple access (WCDMA), long term evolution (LTE), and wireless broadband internet (WiBro). The communication unit 60 may be a communication module, which supports at least one of the above-mentioned communication technologies and may be changed in various ways within the range well-known to those skilled in the art.

The communication unit 60 temporarily stores data received from the sensor unit 40 or the location measuring unit 50 under water, and then, transmits the temporarily stored data to the outside when the swimming assistance apparatus 100 comes out of water. As an example, the location measuring unit 50 and the communication unit 60 may be arranged at some area of the inside of the body part 10.

The swimming assistance apparatus 100 according to an embodiment of the present disclosure may further include a battery unit (not shown), which supplies electric power to the sensor unit 40, the location measuring unit 50 and the communication unit 60. The battery unit may be chargeable by a wireless charging system.

Figure 3A:
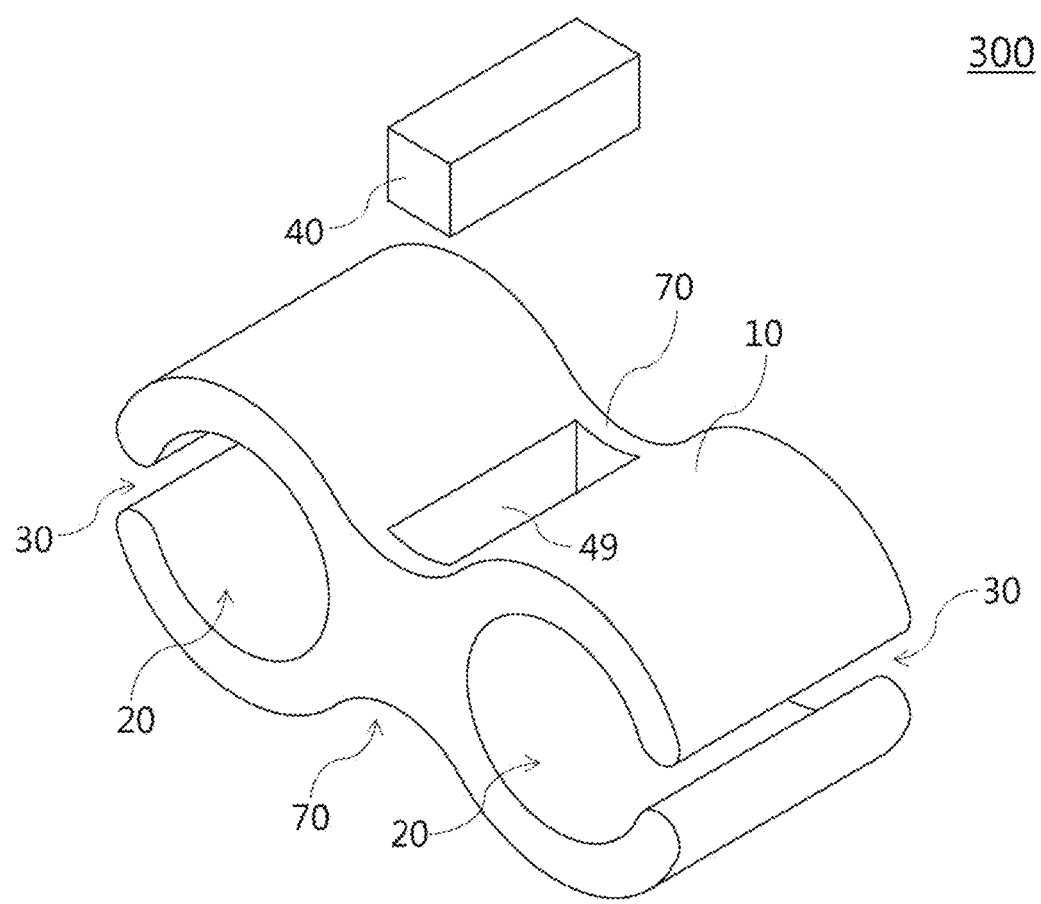
FIGS. 3A and 3B are a view showing a swimming assistance apparatus according to another embodiment of the present disclosure.
Figure 3B:
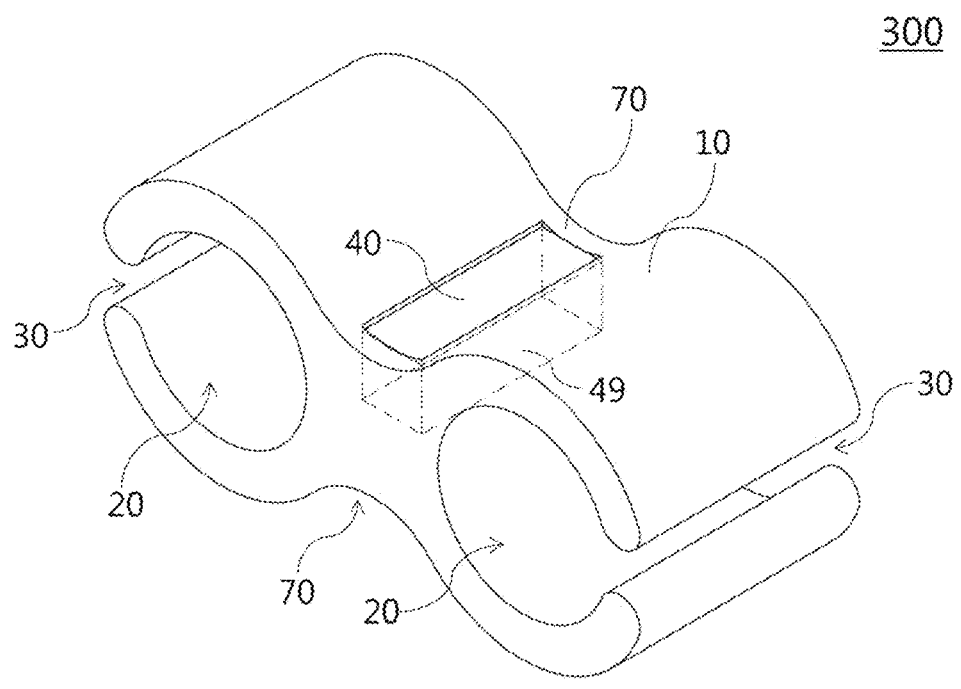

FIGS. 3A and 3B are a view showing a swimming assistance apparatus according to another embodiment of the present disclosure. FIG. 3A is a view showing a state where the sensor unit 40 is separated from the body part 10, and FIG. 3B is a view showing a state where the sensor unit 40 is combined to the body part 10.

As shown in FIGS. 3A and 3B, the swimming assistance apparatus 300 according to another embodiment of the present disclosure may include a sensor unit insertion recess 49, which is formed at one area of the body part 10 and is inwardly recessed to a predetermined depth of the body part 10, and to which the sensor unit 40 is inserted. The sensor unit 40 may be formed in a module type capable of being attachable to or detachable from the body part 10, and the form and the depth of the sensor unit insertion recess 49 may correspond to the form and the depth of the sensor unit 40. The sensor unit 40 and the sensor unit insertion recess 49 may be combined to each other through various combining methods, such as Velcro tapes, snap fasteners, magnets, rings, hooks and zippers. The sensor unit insertion recess 49 may be formed in various locations, for instance, may be formed in a depressed part 70 or in the front area of the body part 10.

Referring to FIG. 2, the location measuring unit 50 and the communication unit 60 may be combined integrally with the sensor unit 40 to be detachably attached to the body part 10.

Meanwhile, as shown in FIGS. 3A and 3B, the swimming assistance apparatus 300 may include the depressed part 70 dented inwardly from a middle portion of the body part 10. As an example, the depressed part 70 may be dented toward the inside of the body part 10 from the upper side and the lower side of the body part 10. Moreover, the depressed part 70 may be dented inwardly from one of the upper side and the lower side of the body part 10 or inwardly in the back-and-forth direction of the body part 10. The swimming assistance apparatus 300 according to another embodiment of the present disclosure, which includes the depressed part 70, may reduce manufacturing costs in comparison with the swimming assistance apparatus 100 according to the embodiment described referring to FIGS. 1A and 1B. Furthermore, the swimming assistance apparatus 300 according to another embodiment of the present disclosure may reduce water resistance under water because the profile area of the body part 10 is reduced.

FIGS. 4A to 4D are views showing used states of the swimming assistance apparatus according to the embodiment of the present disclosure.

Figure 4A:
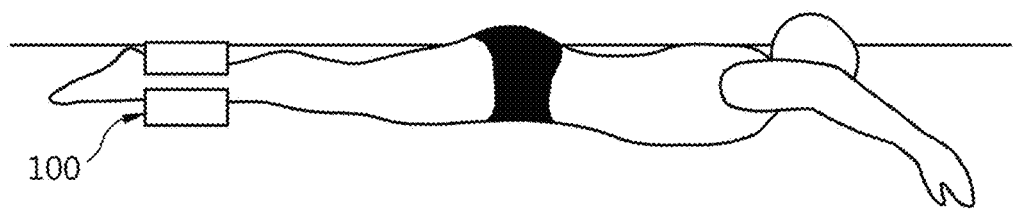
FIGS. 4A to 4D are views showing used states of the swimming assistance apparatus according to the embodiment of the present disclosure.
Figure 4B:
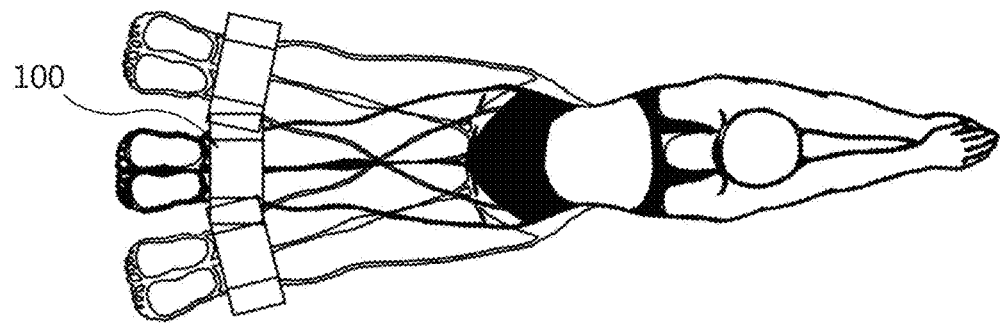

Referring to FIGS. 4A and 4B, the user may wear the swimming assistance apparatus 100 by inserting his or her legs into the fitting holes 20 through the cut parts 30 of the swimming assistance apparatus 100. The user may wear the swimming assistance apparatus 100 on the user's ankles, calves, knees and thighs, and the user's legs may be collected and fixed by the swimming assistance apparatus 100. When the user swims in the state where a part of the user's lower body is inserted into the fitting hole 20, the user's lower body can float on water by buoyancy of the body part 10.

The user can do a swimming style training while moving the waist from side to side or swinging arms in a state where the user's legs are fixed using the swimming assistance apparatus 100. Because of buoyancy of the body part 10, the user can do various swimming style trainings without paying attention to his or her lower body. The user can move forward in the swimming style to move his or her waist from side to side, and it is the same as the swimming style that a fish swims using the tail fin. Through such a swimming style, the user's upper body strength and waist muscles may be strengthened, and the user's twisted pelvis may be corrected. The swimming assistance apparatus 300 according to another embodiment of the present disclosure also may be used as shown in FIGS. 4A and 4B.

Figure 4C:
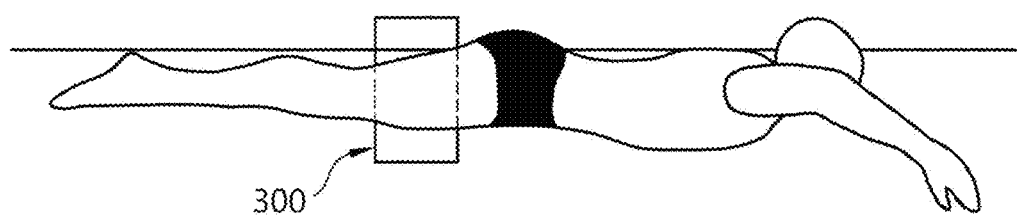
Figure 4D:
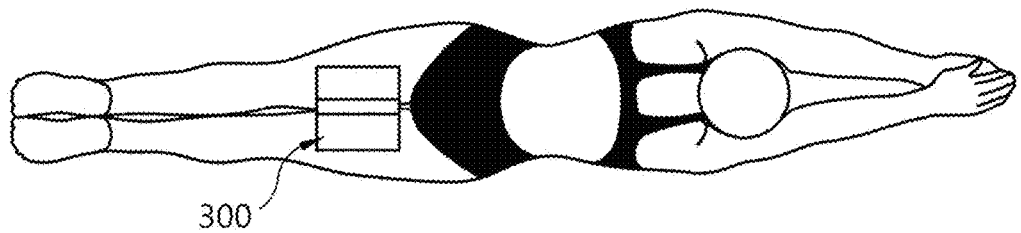

Referring to FIGS. 4C and 4D, the depressed part 70 of the swimming assistance apparatus 300 according to another embodiment of the present disclosure may be fit and fixed between the user's knees or thighs. When the user does the upper body training or has correction of posture, the user's knees or thighs are put on the depressed part 70 of the swimming assistance apparatus 300 so that the swimming assistance apparatus 300 is fit between the user's knees or thighs to function as a pull buoy by strongly pressing toward the inside of the lower body.

In the meantime, the swimming assistance apparatuses 100 or 300 may be used in one of various types, for instance, by pressing the lower body by the depressed part 70 fit between the user's ankles, by inserting the user's thighs into the fitting holes 20, by using the swimming assistance apparatus 100 or 300 while grasping the depressed part 70 with both hands, or fitting the user's upper arm and the side of the user's chest on the depressed part 70 by fitting the swimming assistance apparatus 100 or 300 onto the user's armpit.

Because the user can swim just by the upper body's movement without kicking using the swimming assistance apparatus 100 or 300, the swimming assistance apparatus 100 or 300 may provide an effect that even disabled persons with paraplegia or children or old people who have weak lower bodies can swim. Particularly, the disabled persons with paraplegia can use the swimming assistance apparatus for medical purposes, such as pain relief or treatment. The disabled persons with paraplegia cannot kick or move the waist up and down while swimming, and may go under water while the two legs drift open when the disabled persons with paraplegia enter the water. Therefore, if the disabled persons with paraplegia use the swimming assistance apparatus 100 or 300, they can enjoy swimming with a physical therapist's simple assistance so as to be a good help in rehabilitation treatment.

Figure 5:
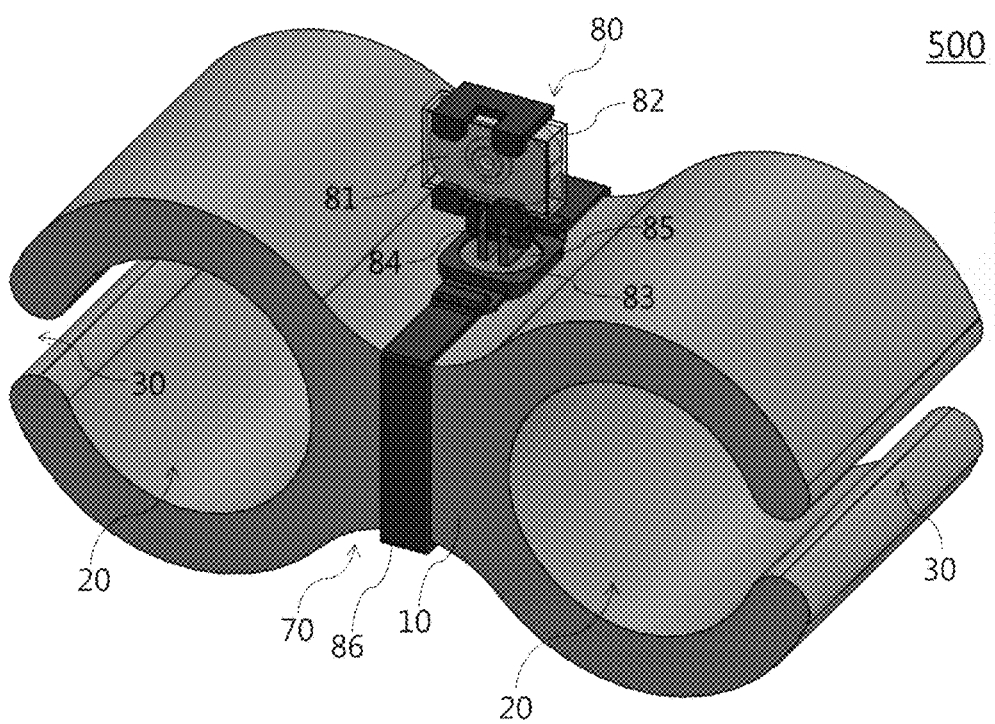
FIG. 5 is a view showing a swimming assistance apparatus according to another embodiment of the present disclosure.

FIG. 5 is a view showing a swimming assistance apparatus according to another embodiment of the present disclosure. Referring to FIG. 5, the swimming assistance apparatus 500 according to another embodiment of the present disclosure may include a body part 10, a fitting hole 20, a cut part 30 and an image capturing unit 80. The swimming assistance apparatus 500 illustrated in FIG. 5 has the form similar with that of the swimming assistance apparatus 100 or 300 described above, but is different from the swimming assistance apparatus 100 or 300 in that it includes the image capturing unit 80.

As shown in FIG. 5, the image capturing unit 80 may be combined to an area of the body part 10 to capture an underwater image. The image capturing unit 80 may include a camera unit 81, a waterproof cover 82, a combining part 83 and a strap part 86.

The camera unit 81 may capture an image of the front to generate image data. The camera unit 81 may be one of various imaging modules to capture images, such as small-sized action cameras, or may be a mobile terminal with an imaging function. The mobile terminal may have a waterproof function.

The waterproof cover 82 may be combined around the camera unit 81 to prevent water infiltration. According to embodiments, the waterproof cover 82 may be omitted if the camera unit 81 has a waterproof function.

The combining part 83 may be combined to the waterproof cover 82 and the strap part 86. The combining part 83 may include a hinge part 84, and the camera unit 81 rotates on the hinge part 84 to regulate a camera angle. Furthermore, the combining part 83 may further include a rotating part 85 disposed at the lower end of the hinge part 84, and the rotating part 85 may be rotatable to an angle of 360 degrees. The user may regulate the camera angle of the camera unit 81 in various ways using the hinge part 84 and the rotating part 85.

The strap part 86 may be combined to the combining part 83 and combined to the swimming assistance apparatus 500 in the form to surround an area of the body part 10. The strap part 86 may be made with an elastic band or Velcro tape. As an example, as shown in FIG. 5, the strap part 86 may be combined to an area surrounding the depressed part 70, and may be released according to the user's manipulation so that the image capturing unit 80 can be detachably attached to the body part 10.

The swimming assistance apparatus 500 according to another embodiment of the present disclosure can easily capture an underwater image when the user swims in the state where the user's lower body is inserted into the fitting hole 20, because the camera unit 81, which is capable of capturing underwater images, is combined to the body part 10 through the combining part 83 and the strap part 86. Conventionally, it is not easy to capture an underwater image during swimming because a camera cannot be mounted at a proper location. However, the swimming assistance apparatus 500 according to another embodiment of the present disclosure solves the above-mentioned problem.

Figure 6:
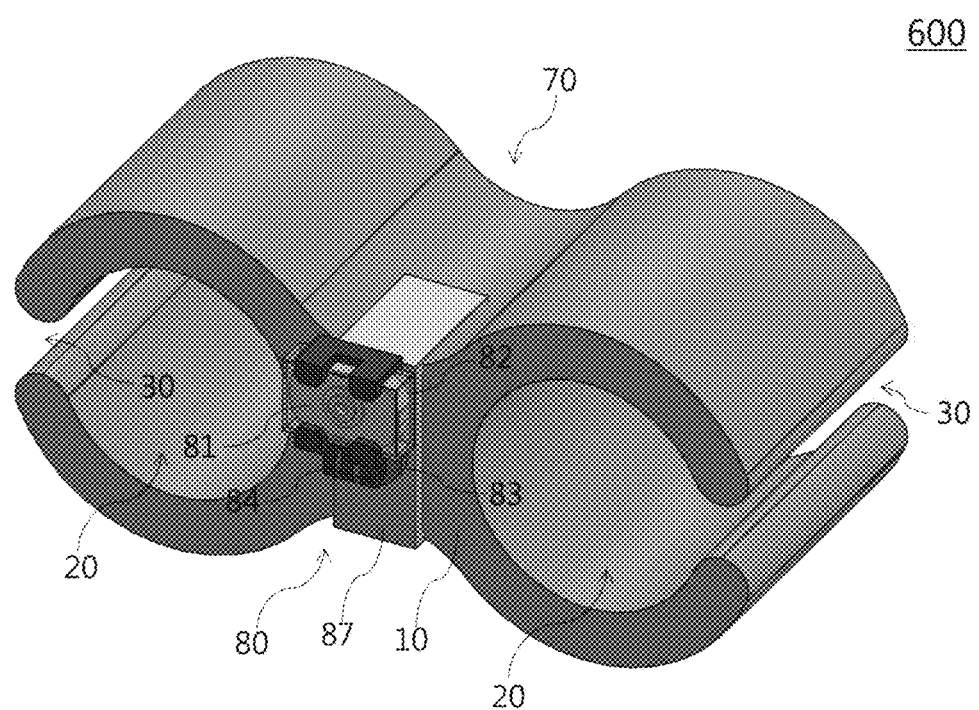
FIG. 6 is a view showing a swimming assistance apparatus according to another embodiment of the present disclosure.

FIG. 6 is a view showing a swimming assistance apparatus according to another embodiment of the present disclosure. Referring to FIG. 6, the swimming assistance apparatus 600 according to another embodiment of the present disclosure may include a body part 10, a fitting hole 20, a cut part 30 and an image capturing unit 80. The swimming assistance apparatus 600 illustrated in FIG. 6 is similar to the swimming assistance apparatus 500 described referring to FIG. 5, but is different from the swimming assistance apparatus 500 in the form of the image capturing unit 80.

As shown in FIG. 6, the image capturing unit 80 may be combined to an area of the body part 10 to capture an underwater image. The image capturing unit 80 may include a camera unit 81, a waterproof cover 82, a combining part 83 and a clip part 87.

Because the forms and operations of the camera unit 81, the waterproof cover 82 and the combining part 83 are similar to those of the swimming assistance apparatus 500, their detailed descriptions will be omitted.

The clip part 87 may be combined to the combining part 83 or combined to the swimming assistance apparatus 600 by gripping an area of the body part 10 as shown in FIG. 6. The clip part 87 may include a spring, which generates a pulling force between both ends in order to grip an area of the body part 10. The combined location of the clip part 87 may be changed according to the user's manipulation, and the image capturing unit 80 may be attached to and detached from the body part 10 according to whether the clip part 87 is combined to the body part 10 or not.

Figure 7A:
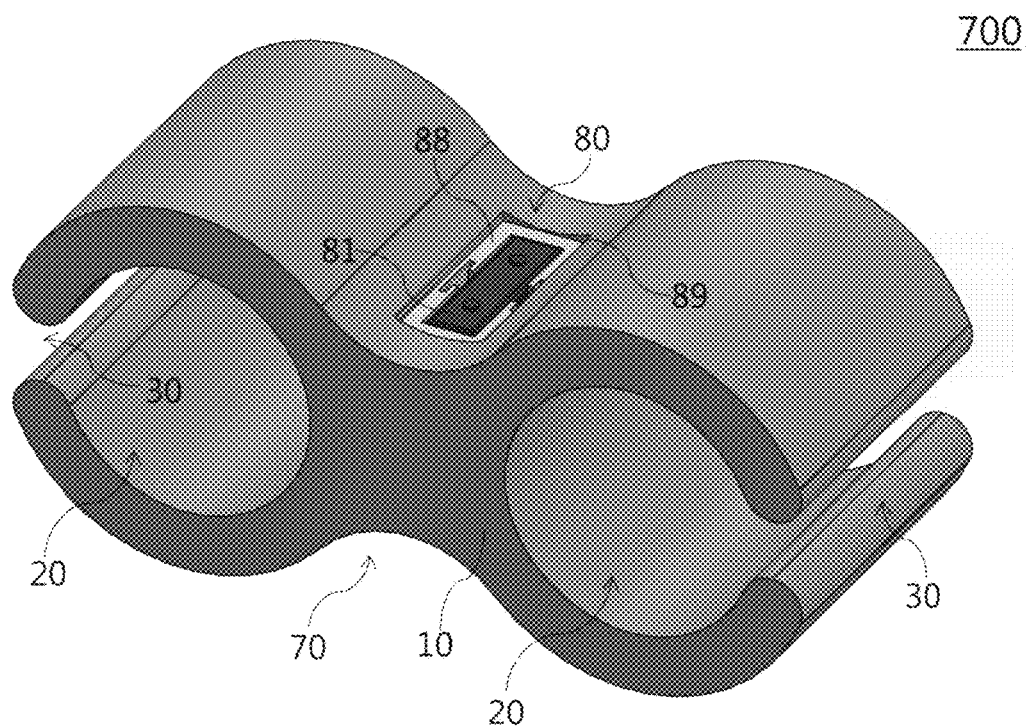
FIGS. 7A and 7B are views showing a swimming assistance apparatus according to another embodiment of the present disclosure.
Figure 7B:
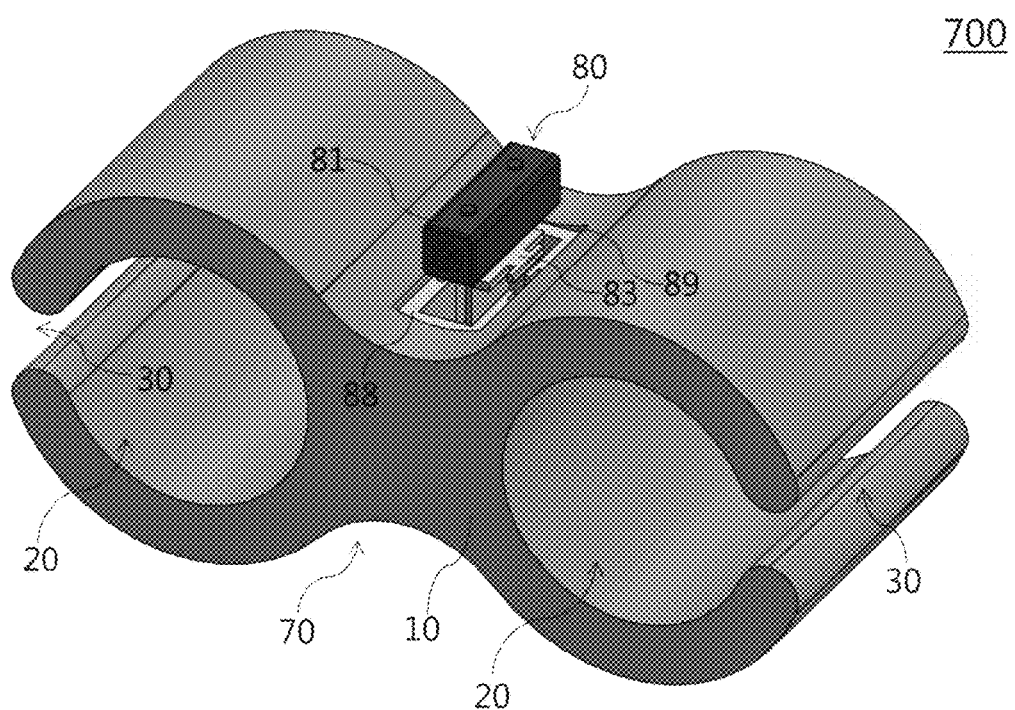

FIGS. 7A and 7B are views showing a swimming assistance apparatus according to another embodiment of the present disclosure. Referring to FIGS. 7A and 7B, the swimming assistance apparatus 700 according to another embodiment of the present disclosure may include a body part 10, a fitting hole 20, a cut part 30 and an image capturing unit 80. The swimming assistance apparatus 700 illustrated in FIGS. 7A and 7B is similar to the swimming assistance apparatus 500 described referring to FIG. 5, but is different from the swimming assistance apparatus 500 in that the swimming assistance apparatus 700 further includes a camera insertion recess 89 and the image capturing unit 80 is different from that of the swimming assistance apparatus 500 in its form.

As shown in FIGS. 7A and 7B, the swimming assistance apparatus 700 according to another embodiment of the present disclosure may have the camera insertion recess 89, which is formed at an area of the body part 10 and is dented inwardly so that the image capturing unit 80 is inserted thereinto. As shown in FIG. 7A, the image capturing unit 80 may have a camera unit 81 which captures an image of the front to generate image data, and the image capturing unit 80 may be inserted and combined into the camera insertion recess 89.

FIG. 7A illustrates that the camera insertion recess 89 is formed in the middle of the upper end of the depressed part 70, but the location of the camera insertion recess 89 may be changed in various ways, for instance, the camera insertion recess 89 may be formed in the back-and-forth direction of the body part 10. The form of the camera insertion recess 89 may be also varied in correspondence with the form of the image capturing unit 80.

The image capturing unit 80 may be combined to an area of the body part 10 to capture an underwater image. The image capturing unit 80 may include a camera unit 81, a combining part 83 and a guide part 88.

The guide part 88 may be inserted and combined into the camera insertion recess 89, and has slide grooves formed at both sides thereof to allow insertion of the combining part 83.

The combining part 83 may be combined to the camera unit 81, and has slide protrusions formed at both sides thereof to be combined with the slide grooves of the guide part 88. Therefore, the camera unit 81 and the combining part 83 may slidably move in a vertical direction as illustrated in FIGS. 7A and 7B. According to an embodiment, the combining part 83 and the guide part 88 may be omitted and the camera unit 81 may be directly inserted and combined into the camera insertion recess 89.

According to an embodiment, the swimming assistance apparatuses 500, 600, 700 and 800 described referring to FIGS. 5 to 8B may further include a user terminal, such as a smart phone, for the camera unit 81. In this instance, the swimming assistance apparatuses may capture underwater images using a camera of the smart phone and measure the posture of the swimming assistance apparatus using an acceleration sensor and a gyro sensor embedded in the smart phone.

Figure 8A:
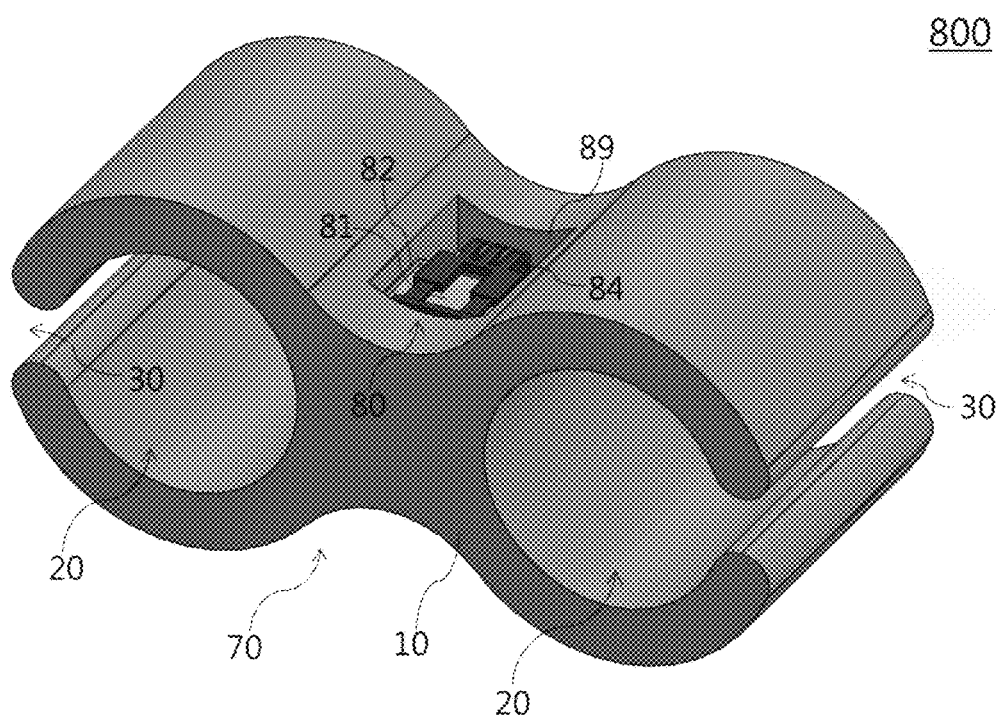
FIGS. 8A and 8B are views showing a swimming assistance apparatus according to another embodiment of the present disclosure.
Figure 8B:
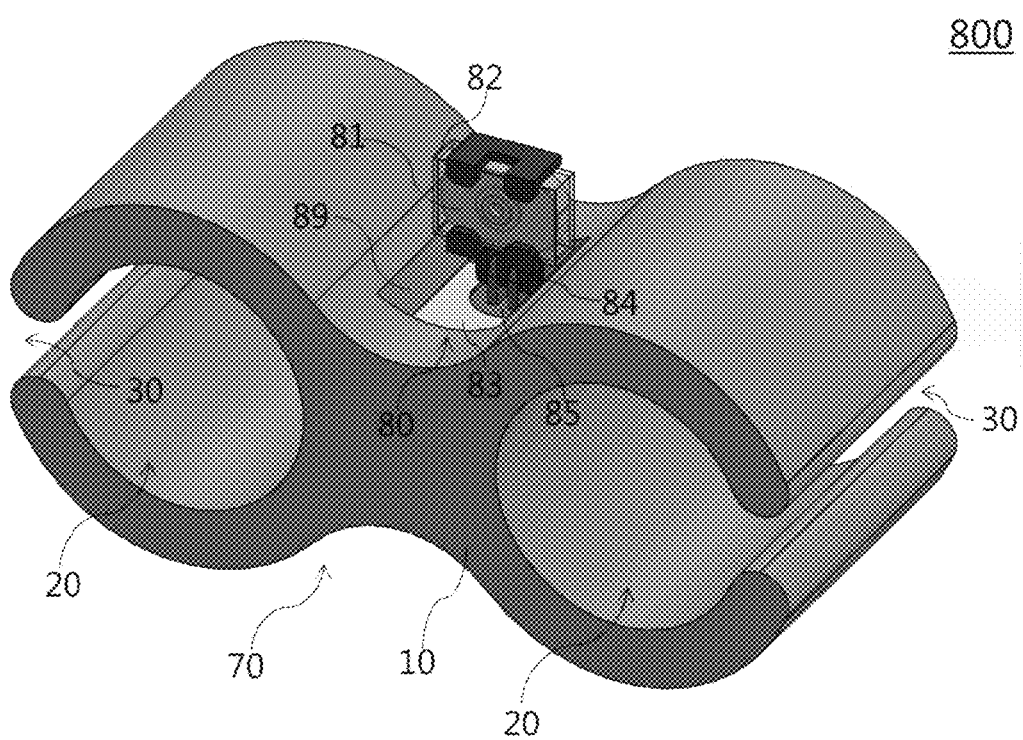

FIGS. 8A and 8B are views showing a swimming assistance apparatus according to another embodiment of the present disclosure. Referring to FIGS. 8A and 8B, the swimming assistance apparatus 800 according to another embodiment of the present disclosure may include a body part 10, a fitting hole 20, a cut part 30 and an image capturing unit 80. The swimming assistance apparatus 800 illustrated in FIGS. 8A and 8B is similar to the swimming assistance apparatus 500 described referring to FIG. 5, but is different from the swimming assistance apparatus 500 in that the swimming assistance apparatus 800 further includes a camera insertion recess 89 and the image capturing unit 80 is different from that of the swimming assistance apparatus 500 in its form.

As shown in FIGS. 8A and 8B, the swimming assistance apparatus 700 according to another embodiment of the present disclosure may have the camera insertion recess 89, which is formed at an area of the body part 10 and is dented inwardly so that the image capturing unit 80 is inserted thereinto. As shown in FIG. 8A, the image capturing unit 80 may be inserted into the camera insertion recess 89.

The image capturing unit 80 may be combined to an area of the body part 10 to capture an underwater image. The image capturing unit 80 may include a camera unit 81, a waterproof cover 82 and a combining part 83. Because the forms and the operations of the camera unit 81 and the waterproof cover 82 are similar to those of the swimming assistance apparatus 500 described referring to FIG. 5, their detail descriptions will be omitted.

The combining part 83 may be inserted and combined into the camera insertion recess 89 or a part of the combining part 83 may be combined to the camera unit 81. As shown in FIGS. 8A and 8B, the camera unit 81 rotates on a hinge part 84 formed on the combining part 83 to be inserted into the camera insertion recess 89 or to protrude outwardly from the camera insertion recess 89. As shown in FIG. 8B, the camera unit 81 may capture an underwater image in an erect state.

Figure 9A:
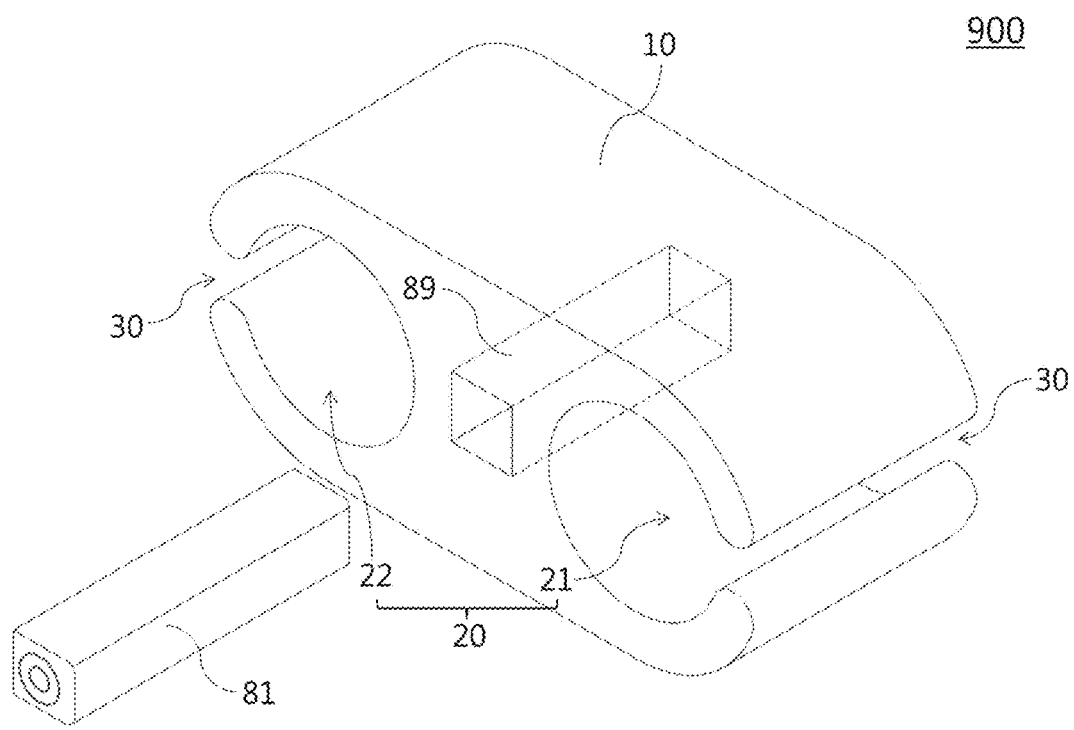
FIGS. 9A and 9B are views showing a swimming assistance apparatus according to another embodiment of the present disclosure.
Figure 9B:
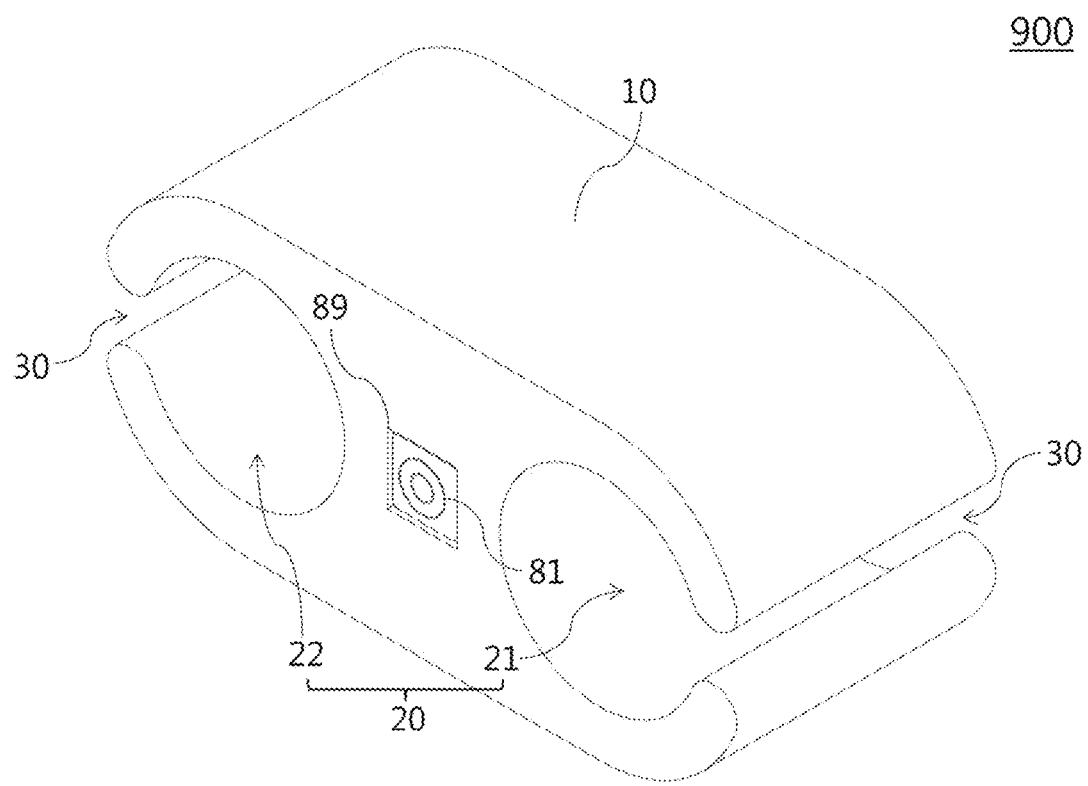

FIGS. 9A and 9B are views showing a swimming assistance apparatus according to another embodiment of the present disclosure. Referring to FIGS. 9A and 9B, the swimming assistance apparatus 900 according to the seventh another embodiment of the present disclosure may include a body part 10, a fitting hole 20, a cut part 30, and a camera insertion recess 89.

As shown in FIGS. 9A and 9B, the swimming assistance apparatus 900 according to another embodiment of the present disclosure may further include a camera insertion recess 89, which is formed at an area of the body part 10 and is dented inwardly so that the camera unit 81 is inserted thereinto. The camera insertion recess 89 may extend in a longitudinal direction of the fitting hole 20. FIG. 9A illustrates that the camera insertion recess 89 is formed in the front face of the body part 10, but the location of the camera insertion recess 89 may be changed in various ways, for instance, the camera insertion recess 89 may be formed in the back-and-forth direction of the body part 10. The form of the camera insertion recess 89 may be also varied in correspondence with the form of the camera unit 81.

The camera unit 81 captures an underwater image to generate image data, may be formed in a cuboid shape as shown in FIG. 9B, and may be inserted and combined into the camera insertion recess 89.

According to an embodiment, the swimming assistance apparatuses 500, 600, 700, 800 and 900 described referring to FIGS. 5 to 9B may further include a mobile terminal, such as a smart phone, for the camera unit 81. In this instance, the swimming assistance apparatuses may capture underwater images using a camera of the smart phone and measure the posture of the swimming assistance apparatus using an acceleration sensor and a gyro sensor embedded in the smart phone. Moreover, the swimming assistance apparatuses may communicate with external servers or external devices using a communication module embedded in the smart phone, and supply the user with various kinds of information, such as the user's swimming work rate, swim section, swim speed, swim distance, swim time and calorie consumption, using application programs executed in the smart phone.

In the meantime, the swimming assistance apparatuses 500, 600, 700, 800 or 900 described referring to FIGS. 5 to 9B may further include a location measuring unit 50, which measures location of the swimming assistance apparatus 500, 600, 700, 800 or 900 and outputs location information. Furthermore, the swimming assistance apparatuses 500, 600, 700, 800 or 900 may further include a sensor unit 40, which measures at least one of the user's posture information, work rate information and bio-information. The swimming assistance apparatuses 500, 600, 700, 800 or 900 may further include a communication unit 60, which transmits the image data generated by the camera unit 81 and the location information generated by the location measuring unit 50 to the outside. The communication unit 60 may transmit at least one of the user's posture information, work rate information and bio-information measured by the sensor unit 40 to the outside.

According to an embodiment, the communication unit 60 may transmit the image data generated by the camera unit 81, the location information generated by the location measuring unit 50, and the user's posture information, work rate information and bio-information measured by the sensor unit 40 to a user terminal (not shown). The user terminal may be one of terminals of various types or electronic devices, which is capable of doing data communication with the swimming assistance apparatus by wire or by radio, such as personal computers, cellular phones, smart phones, tablet PCs, notebook computers and so on, and may be changed in various ways within a known range among those skilled in the art.

The user terminal may extract various kinds of information, such as the user's swimming work rate, swim section, swim speed, swim distance, swim time and calorie consumption, using the user's posture information, work rate information and bio-information measured by the sensor unit 40 and supply them to the user. The information of the user's work rate and others may be shared with other people to be displayed on a list in a community, a chatting room or an SNS.

Additionally, the user terminal supplies the user with information of swimming style correction and information of posture correction from the user's posture information, and also supplies the user with a change of the user's physical condition using the user's heart beat information. The user terminal may analyze the user's swimming style by analyzing the user's posture information, work rate information and bio-information.

The user terminal may interwork the image data generated by the camera unit 81 to social network services, and supply the location that the image data containing the location information is captured to other users. In addition, the user terminal may provide information of famous swimming pools and may authorize that the user visited the corresponding swimming pool using the location information when the user visited the corresponding swimming pool to swim or captured an underwater image.

Figure 10A:
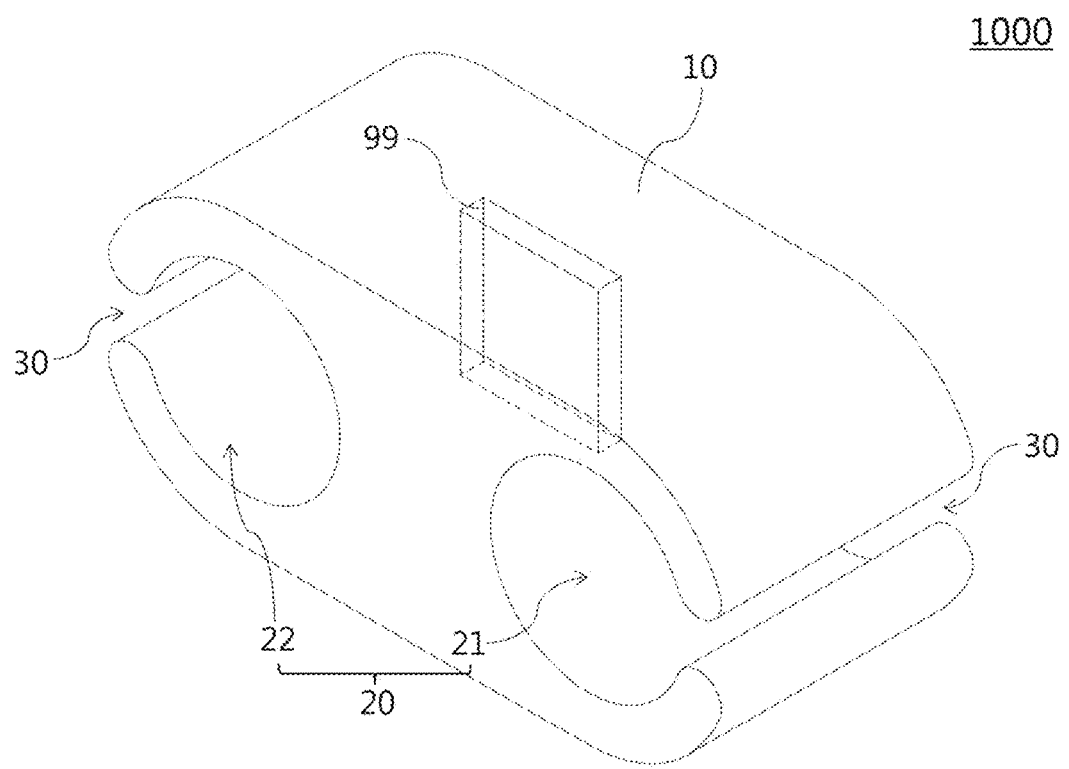
FIGS. 10A and 10B are views showing a swimming assistance apparatus according to another embodiment of the present disclosure.
Figure 10B:
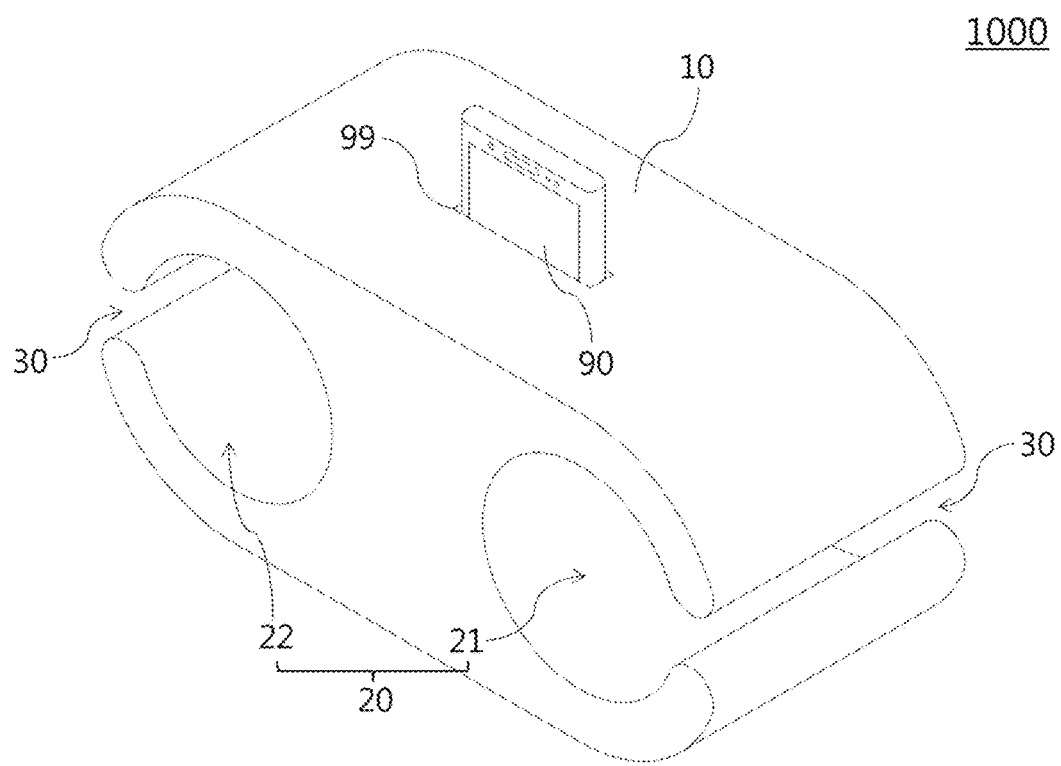

FIGS. 10A and 10B are views showing a swimming assistance apparatus according to another embodiment of the present disclosure. Referring to FIGS. 10A and 10B, the swimming assistance apparatus 1000 according to another embodiment of the present disclosure may include a body part 10, a fitting hole 20, a cut part 30 and a terminal insertion recess 99. The swimming assistance apparatus 1000 illustrated in FIGS. 10A and 10B is similar to the swimming assistance apparatus 100 described referring to FIG. 1, but is different from the swimming assistance apparatus 100 in that the swimming assistance apparatus 1000 further includes a terminal insertion recess 99.

The terminal insertion recess 99 may be formed at an area of the body part 10 and may be inwardly dented to a predetermined depth of the body part 10. The terminal insertion recess 99 may be dented vertically relative to the upper surface of the body part 10 so that the mobile terminal 90 can be inserted vertically. As an example, the mobile terminal 90 may be inserted into the terminal insertion recess 99 in a vertically standing state relative to the upper surface of the body part 10.

The mobile terminal 90 may be a terminal like a smart phone, and may be inserted and combined into the terminal insertion recess 99. The mobile terminal 90 may include a camera which captures an image of the front to generate image data. The mobile terminal 90 may further include at least one of a posture sensor, which measures at least one of slope information and angular velocity information of the mobile terminal 90, and a work rate sensor, which measures at least one of speed information and travel distance information of the mobile terminal 90. Moreover, the mobile terminal 90 may include a communication unit for transmitting image data generated by the camera to the outside and a location measuring unit for measuring the location of the mobile terminal 90 to output location information. The mobile terminal 90 may have a waterproof function.

The user may capture an underwater image using a camera of the mobile terminal 90, and measure the posture of the swimming assistance apparatus 1000 using an acceleration sensor or a gyro sensor embedded in the mobile terminal 90. Furthermore, the swimming assistance apparatus 1000 may communicate with external servers or external devices because the communication unit 60 is embedded in the mobile terminal 90. The swimming assistance apparatus 1000 may supply the user with various kinds of information, such as the user's swimming work rate, swim section, swim speed, swim distance, swim time and calorie consumption, using application programs executed in the smart phone. Additionally, the swimming assistance apparatus 1000 may measure the location of the mobile terminal 90 to output location information because the location measuring unit 50 is embedded in the mobile terminal 90.

The information of the user's work rate and others may be shared with other people, and may be displayed on the mobile terminal 90 in the form of a list in a community, a chatting room or an SNS. Additionally, the mobile terminal 90 supplies the user with information of swimming style correction and information of posture correction from the user's posture information. The mobile terminal 90 may interwork the image data generated by the camera to social network services, and supply the location that the image data containing the location information is captured to other users. In addition, the mobile terminal 90 may provide information of famous swimming pools and may authorize that the user visited the corresponding swimming pool using the location information when the user visited the corresponding swimming pool to swim or captured an underwater image. Such functions of the mobile terminal 90 may be realized through application programs.

As shown in FIGS. 10A and 10B, the terminal insertion recess 99 may be formed at a part of the upper surface of the body part 10, and its width, length and depth are set to correspond to the form of the mobile terminal 90, such as a smart phone. The width and the length of the terminal insertion recess 99 may be shorter than the width and the length of the upper surface of the body part 10. As an example, if the width and the length of the terminal insertion recess 99 are shorter than the width and the length of the mobile terminal 90, the mobile terminal 90 may be inserted and fixed into the terminal insertion recess 99 by flexibility of the body part 10. According to an embodiment, in order to prevent separation of the mobile terminal 90 inserted into the terminal insertion recess 99, the swimming assistance apparatus 1000 may further include a terminal combining part (not shown) implemented by various combining means, such as Velcro tapes, snap fasteners, magnets, rings, hooks and zippers.

FIGS. 10A and 10B illustrate that the terminal insertion recess 99 is formed in the middle of the upper end of the body part 10, but the location of the terminal insertion recess 99 may be varied and the terminal insertion recess 99 may be formed in the back-and-forth direction of the body part 10. The form of the terminal insertion recess 99 may be also varied in correspondence with the form of the mobile terminal 90.

Figure 11A:
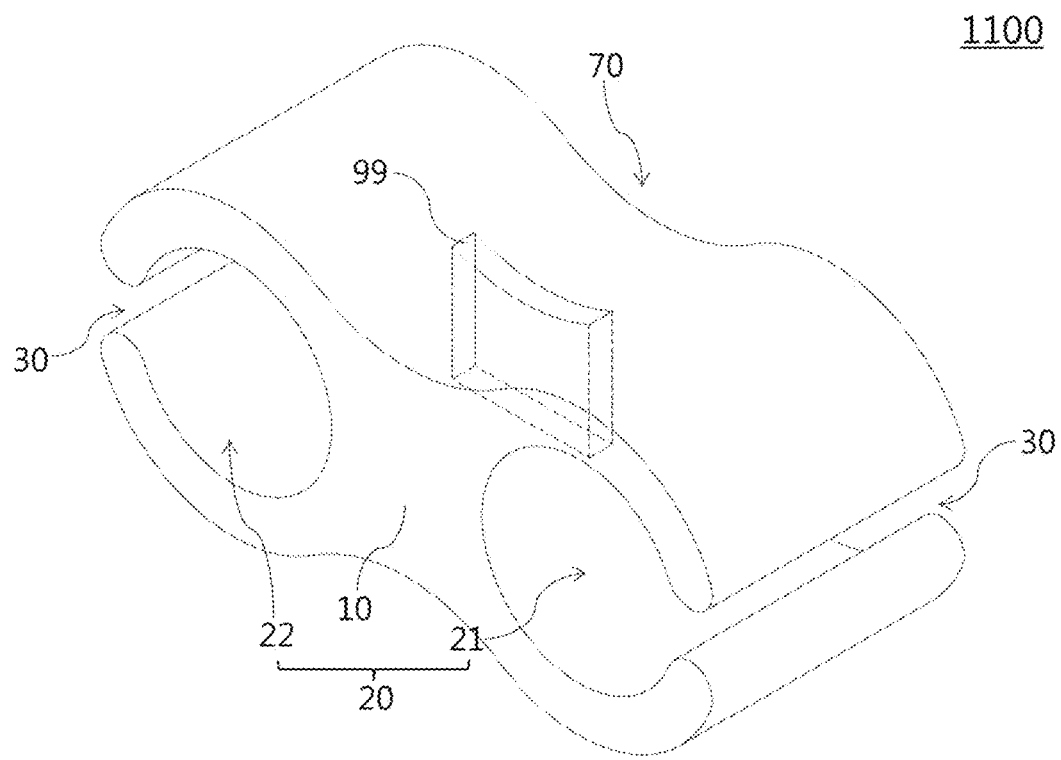
FIGS. 11A and 11B are views showing a swimming assistance apparatus according to another embodiment of the present disclosure.
Figure 11B:
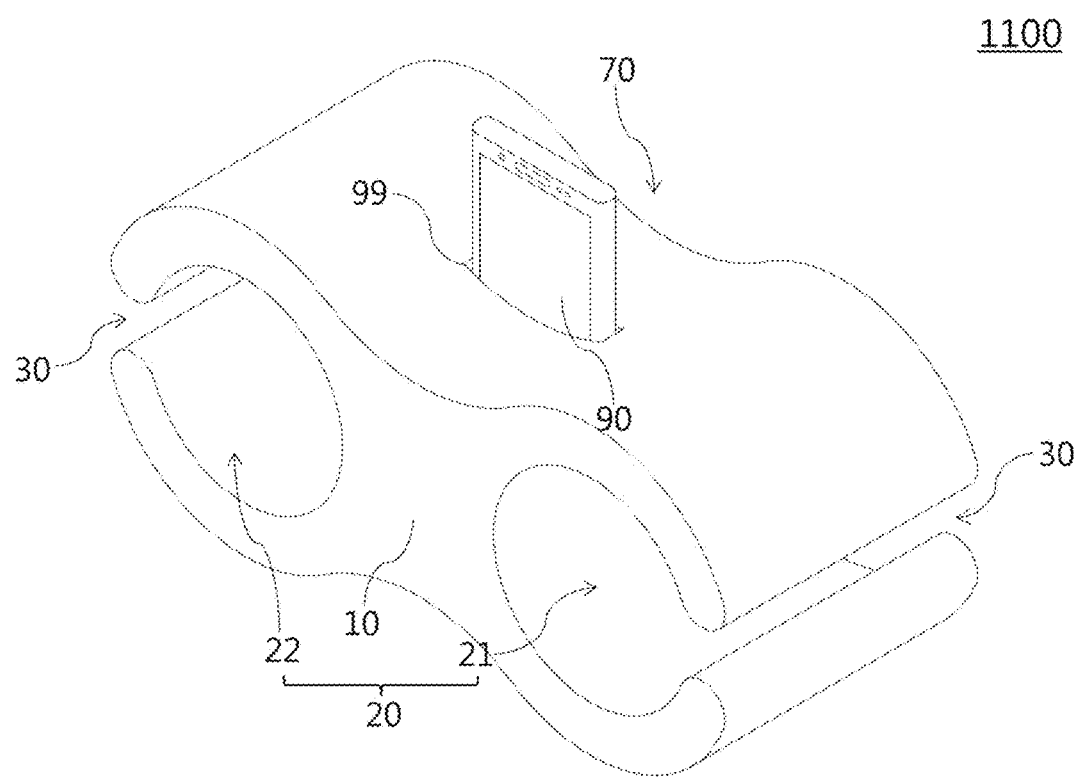

FIGS. 11A and 11B are views showing a swimming assistance apparatus according to another embodiment of the present disclosure. Referring to FIGS. 11A and 11B, the swimming assistance apparatus 1100 according to another embodiment of the present disclosure may include a body part 10, a fitting hole 20, a cut part 30, a depressed part 70 and a terminal insertion recess 99. The swimming assistance apparatus 1100 illustrated in FIGS. 11A and 11B includes the terminal insertion recess 99 similarly to the swimming assistance apparatus 1000 described referring to FIG. 10, but is different from the swimming assistance apparatus 1000 in that the swimming assistance apparatus 1100 has the depressed part 70.

The terminal insertion recess 99 may be formed at an area of the depressed part 70 and may be formed to be inwardly dented so that the mobile terminal 90 is inserted into the depressed part 70. As shown in FIG. 11B, the mobile terminal 90 may be inserted and fixed into the terminal insertion recess 99. The swimming assistance apparatus 1100 may further include one of various terminal combining part, such as Velcro tapes, snap fasteners, magnets, rings, hooks and zippers, in order to fasten the mobile terminal 90 into the terminal insertion recess 99.

Figure 12A:
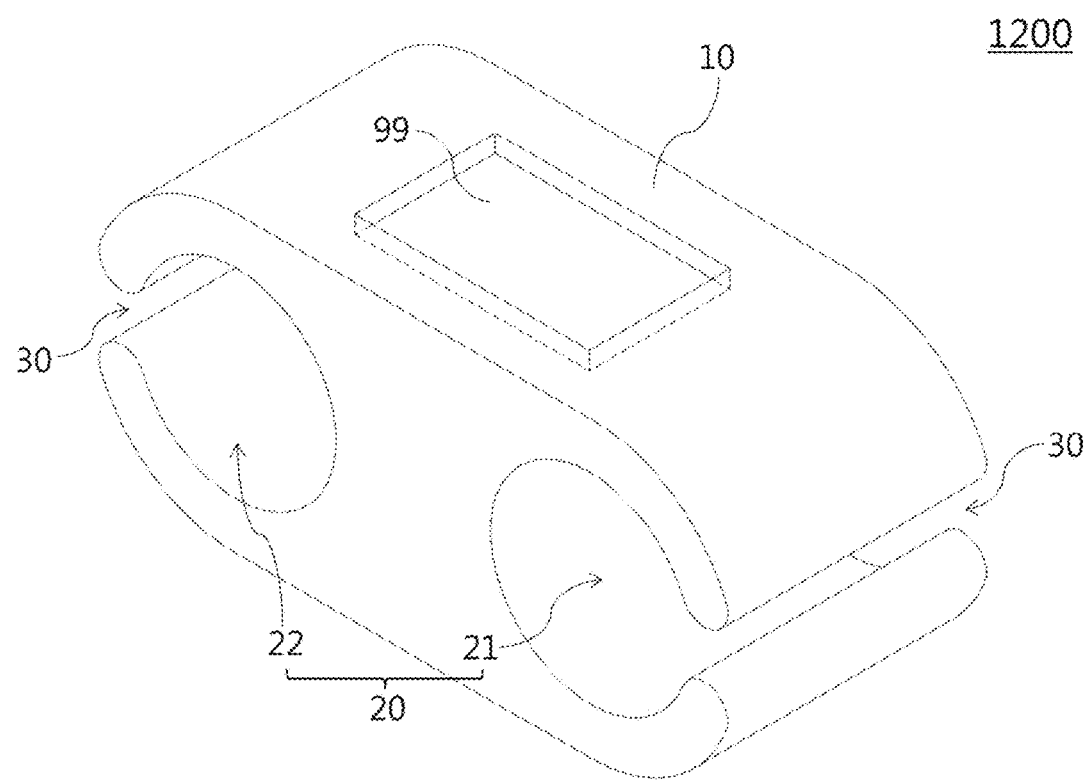
FIGS. 12A and 12B are views showing a swimming assistance apparatus according to another embodiment of the present disclosure.
Figure 12B:
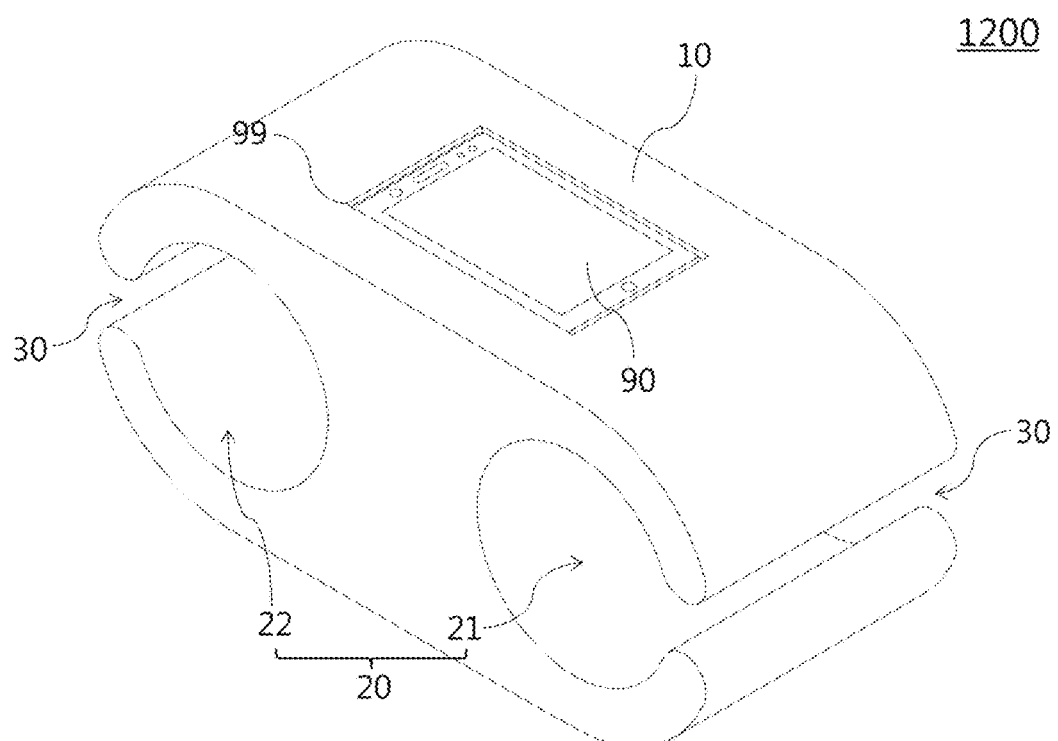

FIGS. 12A and 12B are views showing a swimming assistance apparatus according to another embodiment of the present disclosure. Referring to FIGS. 12A and 12B, the swimming assistance apparatus 1200 according to another embodiment of the present disclosure may include a body part 10, a fitting hole 20, a cut part 30 and a terminal insertion recess 99.

The terminal insertion recess 99 may be formed at an area of the body part 10, and may be formed to be inwardly dented so that the mobile terminal 90 is inserted into the terminal insertion recess 99 in a horizontal direction. The mobile terminal 90 may be inserted into the mobile insertion recess 99 while being level with respect to the upper surface of the body part 10.

As shown in FIG. 12B, the mobile terminal 90 may be inserted and fixed into the terminal insertion recess 99. The swimming assistance apparatus 1200 may further include one of various terminal combining part, such as Velcro tapes, snap fasteners, magnets, rings, hooks and zippers, in order to fasten the mobile terminal 90 into the terminal insertion recess 99.

In the meantime, referring to FIGS. 1A to 12B, the above-mentioned embodiments may be combined with each other in various ways, and especially, the sensor unit 40, the image capturing unit 80, the mobile terminal 90 and others may be combined with one another in various ways on the basis of the descriptions of the embodiments.

While the present disclosure has been described in connection with what is presently considered to be practical exemplary embodiments, it is to be understood that the present disclosure is not limited to the disclosed embodiments, but on contrary, is intended to cover various modifications and equivalents included within the spirit and scope of the appended claims. Accordingly, the technical scope of the present disclosure shall be determined only according to the attached claims.

What is claimed is:

1. A swimming assistance apparatus comprising:
   a body part made of a material which floats on water or having a hollow tube which floats on water;
   a fitting hole formed in the body part and defined to penetrate through the body part to surround a part of a user's body;
   a cut part defined on at least one side of a wall of the fitting hole;
   a sensor unit for measuring at least one of the user's posture information, work rate information and bio-information; and
   a sensor unit insertion recess formed at an area of the body part and formed to be inwardly dented, and to which the sensor unit is inserted,
   wherein the user's body floats on water by buoyancy of the body part when the user swims in a state where a part of the user's body is inserted into the fitting hole.

2. The swimming assistance apparatus as claimed in claim 1, wherein the sensor unit comprises at least one of:
   a posture sensor for measuring at least one of slope information and angular velocity information of the swimming assistance apparatus;
   a work rate sensor for measuring at least one of speed information and travel distance information of the swimming assistance apparatus; and
   a heart rate sensor for measuring the user's heart beat information.

3. The swimming assistance apparatus as claimed in claim 1, further comprising:
   a communication unit for transmitting at least one of the user's posture information, work rate information and bio-information measured by the sensor unit to the outside.

4. A swimming assistance apparatus comprising:
   a body part made of a material which floats on water or having a hollow tube which floats on water;
   a fitting hole formed in the body part and defined to penetrate through the body part to surround a part of a user's body;
   a cut part defined on at least one side of a wall of the fitting hole; and
   an image capturing unit combined to an area of the body part to capture an image,
   wherein the user's body floats on water by buoyancy of the body part when the user swims in a state where a part of the user's body is inserted into the fitting hole, and the image capturing unit captures an underwater image, and
   wherein the image capturing unit comprises:
   a camera unit which captures an image of a front to generate image data;
   a combining part combined to the camera unit; and
   a strap part combined to the combining part and combined to the body part to surround an area of the body part.

5. The swimming assistance apparatus as claimed in claim 4, further comprising:
   a location measuring unit for measuring the location of the swimming assistance apparatus to output location information; and
   a communication unit for transmitting the image data generated by the camera unit and the location information generated by the location measuring unit to the outside.

6. The swimming assistance apparatus as claimed in claim 4, further comprising:
   a sensor unit for measuring at least one of the user's posture information, work rate information and bio-information; and
   a communication unit for transmitting at least one of the user's posture information, work rate information and bio-information measured by the sensor unit to the outside.

7. The swimming assistance apparatus as claimed in claim 4, wherein the image capturing unit is a mobile terminal.

8. A swimming assistance apparatus comprising:
   a body part made of a material which floats on water or having a hollow tube which floats on water;
   a fitting hole formed in the body part and defined to penetrate through the body part to surround a part of a user's body;
   a cut part defined on at least one side of a wall of the fitting hole; and
   a terminal insertion recess which is formed in an area of the body part and is inwardly dented to a predetermined depth, and to which an area of a mobile terminal is inserted,
   wherein the user's body floats on water by buoyancy of the body part when the user swims in a state where a part of the user's body is inserted into the fitting hole.

9. The swimming assistance apparatus as claimed in claim 8, wherein the terminal insertion recess is formed at an area of the body part and is dented vertically relative to the upper surface of the body part so that the mobile terminal is inserted vertically.

10. The swimming assistance apparatus as claimed in claim 8, wherein the terminal insertion recess is formed at an area of the body part and is inwardly dented such that the mobile terminal is inserted in a horizontal direction.

11. The swimming assistance apparatus as claimed in claim 8, wherein the width and the length of the terminal insertion recess are shorter than the width and the length of the upper surface of the body part respectively.

12. The swimming assistance apparatus as claimed in claim 8, further comprising:
   a terminal combining part implemented by at least one of hook-and-loop fasteners, snap fasteners, magnets, rings, hooks and zippers in order to prevent separation of the mobile terminal inserted into the terminal insertion recess.

13. The swimming assistance apparatus as claimed in claim 8, wherein the mobile terminal comprises:
   a camera for capturing an image of a front to generate image data;
   a posture sensor for measuring at least one of slope information and angular velocity information of the mobile terminal;
   a work rate sensor for measuring at least one of speed information and travel distance information of the mobile terminal;
   a communication unit for transmitting the image data generated by the camera to the outside; and
   a location measuring unit for measuring a location of the mobile terminal to output location information.

* * * * *